(12) United States Patent
Lee et al.

(10) Patent No.: US 8,711,117 B2
(45) Date of Patent: Apr. 29, 2014

(54) ELECTROPHORESIS DISPLAY HAVING TOUCH SCREEN AND METHOD FOR DRIVING THE TOUCH SCREEN

(75) Inventors: Sunghoon Lee, Gumi-si (KR); Howon Son, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 13/283,096

(22) Filed: Oct. 27, 2011

(65) Prior Publication Data

US 2012/0113031 A1   May 10, 2012

(30) Foreign Application Priority Data

Nov. 10, 2010   (KR) .......... 10-2010-0111480

(51) Int. Cl.
   *G06F 3/041* (2006.01)
(52) U.S. Cl.
   USPC .......................... 345/173; 345/107
(58) Field of Classification Search
   USPC ............... 345/173–178, 179, 87–107; 178/18.01–20.01
   See application file for complete search history.

(56) References Cited

U.S. PATENT DOCUMENTS

| | | | |
|---|---|---|---|
| 6,236,386 B1 * | 5/2001 | Watanabe | 345/98 |
| 7,012,600 B2 | 3/2006 | Zehner et al. | |
| 7,053,886 B2 * | 5/2006 | Shin | 345/173 |
| 7,119,772 B2 | 10/2006 | Amundson et al. | |
| 7,170,501 B2 * | 1/2007 | Inamori | 345/173 |
| 7,576,731 B2 * | 8/2009 | Okazaki | 345/173 |
| 2002/0089491 A1 * | 7/2002 | Willig | 345/173 |
| 2004/0100450 A1 * | 5/2004 | Choi | 345/173 |
| 2008/0143668 A1 | 6/2008 | Shin et al. | |
| 2008/0143700 A1 | 6/2008 | Shin et al. | |
| 2008/0150887 A1 | 6/2008 | Kim et al. | |
| 2011/0090160 A1 * | 4/2011 | Chen et al. | 345/173 |
| 2011/0175824 A1 * | 7/2011 | Chiu et al. | 345/173 |
| 2011/0254802 A1 * | 10/2011 | Philipp | 345/174 |

* cited by examiner

*Primary Examiner* — Hong Zhou
(74) *Attorney, Agent, or Firm* — Birch, Stewart, Kolasch & Birch, LLP

(57) ABSTRACT

An electrophoresis display having a touch screen and a method for driving the touch screen are disclosed. The electrophoresis display includes an electrophoresis panel, an electrophoresis driving circuit, which is drives the electrophoresis panel and write an image to the electrophoresis panel, a touch screen panel mounted on the electrophoresis panel, a touch screen driving circuit which outputs coordinate data of a touch position on the touch screen panel based on a signal received from the touch screen panel, and a host system configured which recognize the coordinate data during a non-operation period of the electrophoresis panel as available data and recognize the coordinate data during an operation period of the electrophoresis panel as unavailable data.

7 Claims, 6 Drawing Sheets

(12) United States Patent

ELECTROPHORESIS DISPLAY HAVING TOUCH SCREEN AND METHOD FOR DRIVING THE TOUCH SCREEN

This application claims the benefit of Korean Patent Application No. 10-2010-0111480 filed on Nov. 10, 2010, the entire contents of which is incorporated herein by reference for all purposes as if fully set forth herein.

BACKGROUND OF THE INVENTION

1. Field of the Invention

Embodiments of the invention relate to an electrophoresis display having a touch screen and a method for driving the touch screen.

2. Discussion of the Related Art

When a material having charges is placed in an electric field, the material carries out peculiar motion based on the charges, the size of its molecule, its shape, etc. Such a behavior is referred to as electrophoresis. A phenomenon, in which the material is divided depending on a motion degree, is referred to as electrophoresis. A display device using the electrophoresis has been recently developed. The electrophoresis display has been spotlighted as a display device replacing an existing paper medium or an existing display device The electrophoresis display has been disclosed in U.S. Pat. Nos. 7,012,600 and 7,119,772. To increase the user convenience for the electrophoresis display, as shown in FIG. 1, a study to mount a touch screen panel TSP on an electrophoresis panel EPD is being recently carried out.

When the electrophoresis panel EPD and the touch screen panel TSP are simultaneously driven in a state where the touch screen panel TSP is mounted on the electrophoresis panel EPD, an erroneous operation of a touch screen is generated. Thus, when the touch screen is applied to the electrophoresis display, a countermeasure against the erroneous operation of the touch screen is demanded.

SUMMARY OF THE INVENTION

Embodiments of the invention provide an electrophoresis display having a touch screen and a method for driving the touch screen capable of preventing an erroneous operation of the touch screen.

In one aspect, there is an electrophoresis display including an electrophoresis panel, an electrophoresis driving circuit configured to drive the electrophoresis panel and write an image to the electrophoresis panel, a touch screen panel mounted on the electrophoresis panel, a touch screen driving circuit configured to output coordinate data of a touch position on the touch screen panel based on a signal received from the touch screen panel, and a host system configured to recognize the coordinate data during a non-operation period of the electrophoresis panel as available data and recognize the coordinate data during an operation period of the electrophoresis panel as unavailable data.

A state change interrupt signal, a serial interface clock, and serial interface data including the coordinate data are transferred between the host system and the touch screen driving circuit. The host system controls the state change interrupt signal at a low logic level during the operation period of the electrophoresis panel and controls the state change interrupt signal at a high logic level during the non-operation period of the electrophoresis panel.

The host system ignores data received from the touch screen driving circuit when the state change interrupt signal is at the low logic level.

The touch screen driving circuit transfers the coordinate data to the host system only when the state change interrupt signal is at the high logic level.

The touch screen driving circuit transfers the coordinate data to the host system irrespective of a logic level of the state change interrupt signal.

The electrophoresis display further includes a timing controller configured to transfer image data to the electrophoresis driving circuit and control an operating timing of the electrophoresis driving circuit and an operating timing of the touch screen driving circuit.

The host system transfers the image data to the timing controller, and at the same time, toggles the state change interrupt signal at the low logic level.

In another aspect, there is a method for driving a touch screen of an electrophoresis display including an electrophoresis panel, an electrophoresis driving circuit which drives the electrophoresis panel and writes an image to the electrophoresis panel, a touch screen panel mounted on the electrophoresis panel, and a touch screen driving circuit which outputs coordinate data of a touch position on the touch screen panel based on a signal received from the touch screen panel, the method including deciding whether or not the electrophoresis panel is driven, recognizing the coordinate data during a non-operation period of the electrophoresis panel as available data; and recognizing the coordinate data during an operation period of the electrophoresis panel as unavailable data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the specific embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the invention.

The inventors conducted various experiments to ascertain the cause of an erroneous operation of a touch screen in an electrophoresis display having the touch screen. The touch screen may erroneously operate because of the structure of a touch screen panel or the problem of a touch screen driving circuit. However, the result of the experiments showed that the touch screen erroneously operated by an external cause, in which an electrical noise induced to the surface of an electrophoresis panel while the electrophoresis panel was being driven affected the touch screen, in addition to the above reasons.

Figure 1:
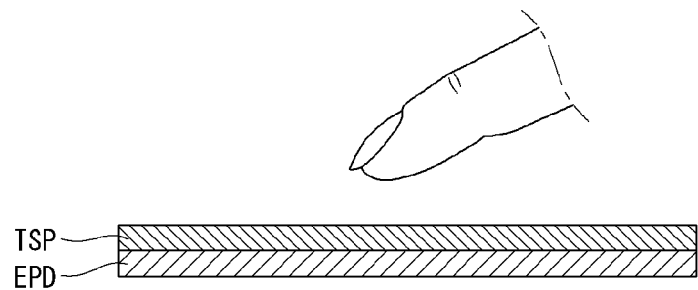
FIG. 1 is a schematic cross-sectional view of a related art electrophoresis display having a touch screen panel.
Figure 2:
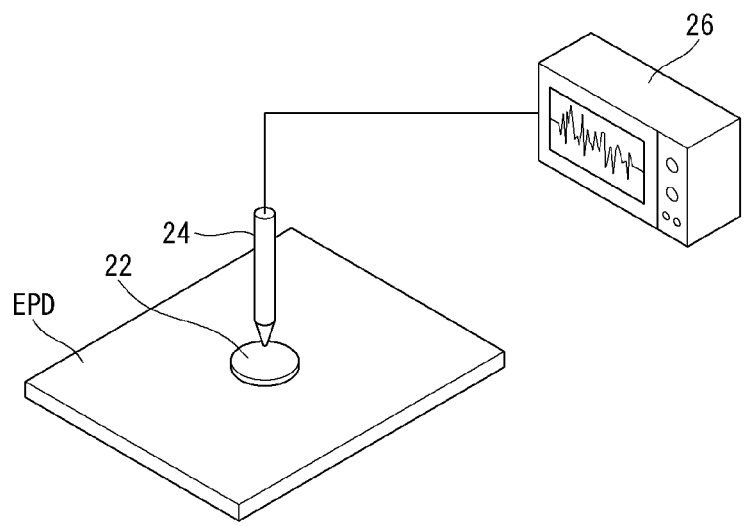
FIG. 2 illustrates a method for measuring an electrical noise induced to the surface of an electrophoresis panel.
Figure 3:
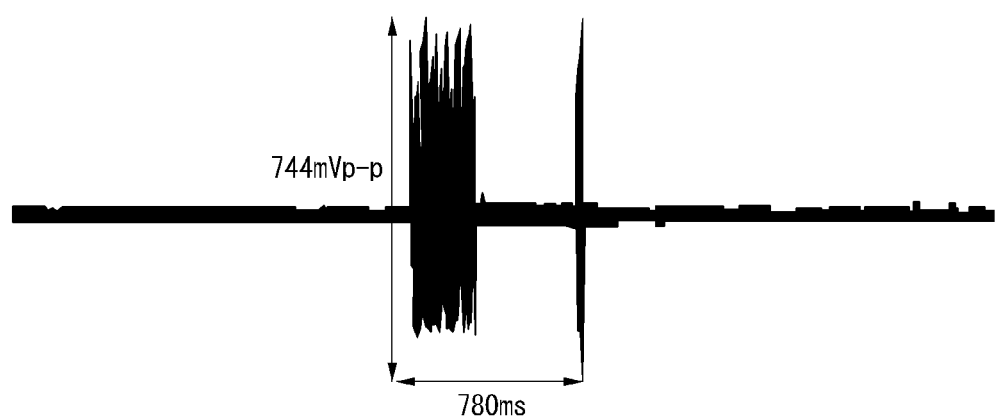
FIG. 3 illustrates a noise measured when an electrophoresis panel is driven using a noise measuring system shown in FIG. 2.

FIG. 2 illustrates an experimental method for measuring an electrical noise induced to the surface of an electrophoresis panel. As shown in FIG. 2, in an experiment for measuring an electrical noise induced to the surface of an electrophoresis panel EDP, a metal plate 22 was placed on the surface of the electrophoresis panel EDP, and a probe 24 connected to a voltage and current measuring instrument 26 contacted the metal plate 22. When a sample image was input to the electrophoresis panel EDP, the electrophoresis panel EDP was driven during an image update period (for example, about 780 ms) of an electrophoresis display. As shown in FIG. 3, during the image update period in which the electrophoresis panel EDP was driven, the voltage of about 744 mVp-p was measured at the surface of the electrophoresis panel EDP. An erroneous operation of the touch screen such as an erroneous touch recognition and an erroneous coordinate recognition may be generated because of an electrical noise of the surface of the electrophoresis panel EDP.

Figure 4:
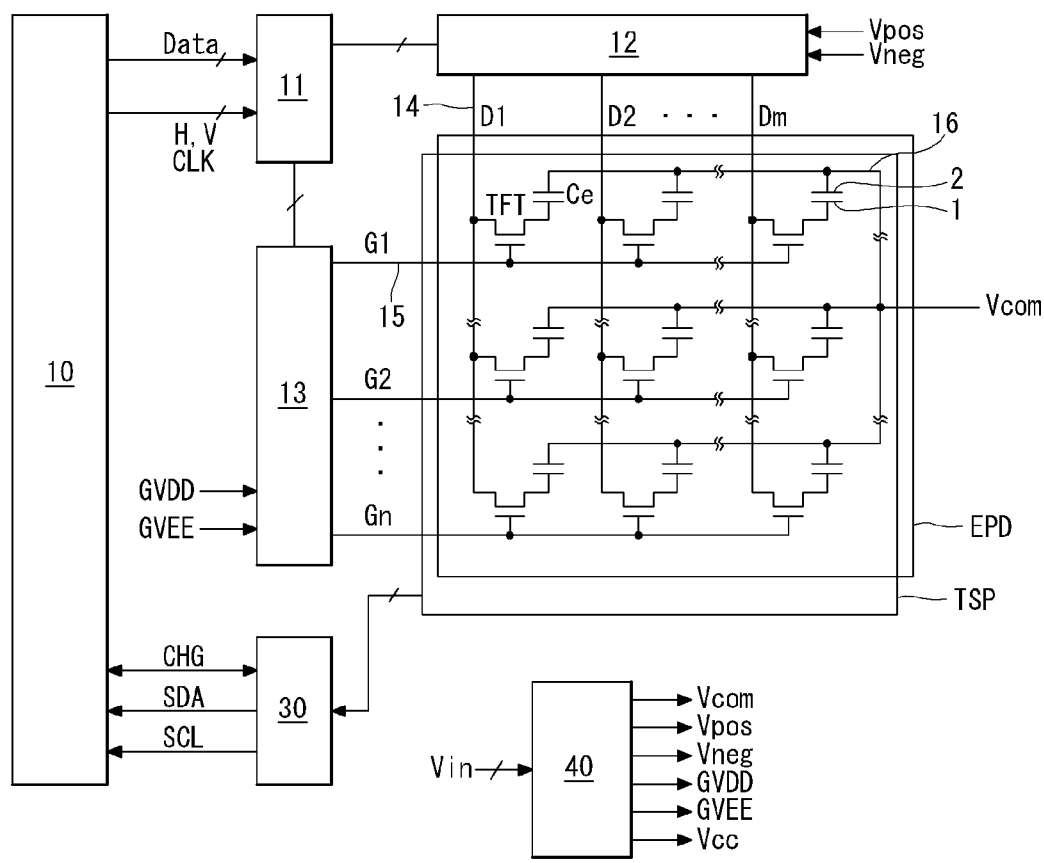
FIG. 4 is a block diagram of an electrophoresis display according to an example embodiment of the invention.
Figure 5:
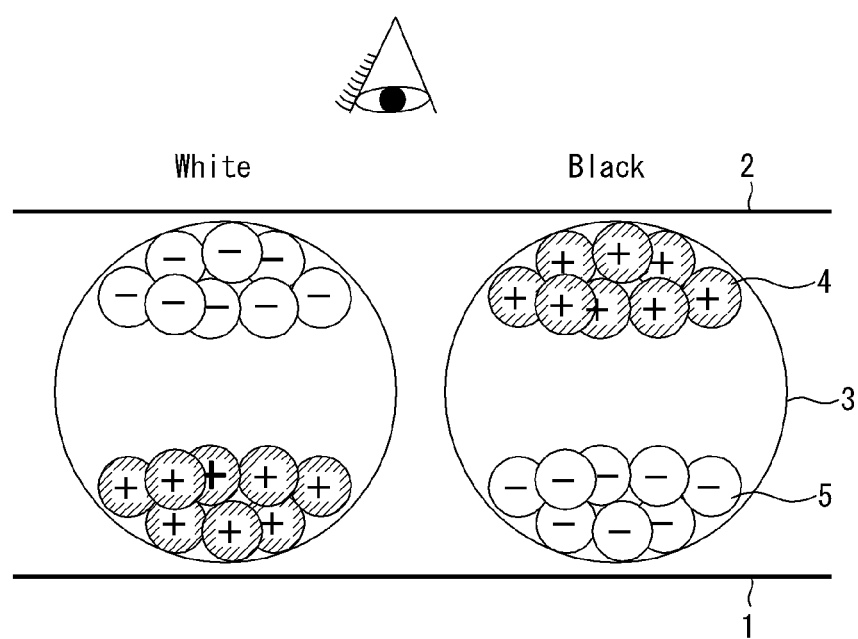
FIG. 5 illustrates a microcapsule structure of a pixel shown in FIG. 4.

FIG. 4 is a block diagram of an electrophoresis display according to an example embodiment of the invention. FIG. 5 illustrates a microcapsule structure of a pixel shown in FIG. 4.

As shown in FIGS. 4 and 5, the electrophoresis display according to the embodiment of the invention includes an electrophoresis panel EPD and a touch screen panel TSP mounted on the electrophoresis panel EPD.

Each of pixels Ce of the electrophoresis panel EPD represents a gray level of image data by microcapsules 3, which are driven by an electric field between a pixel electrode 1 and a common electrode 2. The microcapsules 3 are formed between the pixel electrode 1 and the common electrode 2. The common electrode 2 is formed of a transparent electrode material, for example, indium tin oxide (ITO). Each of the microcapsules 3 includes negatively charged white particles 5 and positively charged black particles 4.

Data lines 14 and gate lines 15 are formed on a lower substrate of the electrophoresis panel EPD to cross each other. The lower substrate of the electrophoresis panel EPD may be manufactured using a glass substrate, a metal substrate, plastic, etc. A thin film transistor (TFT) is formed at each of crossings of the data lines 14 and the gate lines 15. A source electrode of the TFT is connected to the data line 14, a drain electrode of the TFT is connected to the pixel electrode 1 of the pixel Ce, and a gate electrode of the TFT is connected to the gate line 15. When a positive data voltage Vpos is applied to the pixel electrode 1 of the pixel Ce, the pixel Ce represents a black gray level. When a negative data voltage Vneg is applied to the pixel electrode 1 of the pixel Ce, the pixel Ce represents a white gray level. In an image update process, new data is written to the pixels Ce. After the image update process, the pixels Ce hold a gray level of currently written data until they perform a next image update process. The TFTs are turned on in response to a scan pulse from the gate line 15 and select the pixels Ce of one line to display. The TFTs then supply the data voltage from the data line 14 to the pixel electrodes 1 of the selected pixels Ce.

Common electrode lines 16 are formed on an upper substrate of the electrophoresis panel EPD. The common electrode lines 16 are used to simultaneously supply a common voltage Vcom to the common electrodes 2 of all of the pixels Ce. The upper substrate of the electrophoresis panel EPD may be manufactured using transparent glass or a plastic substrate.

The touch screen panel TSP may be implemented as a resistive touch screen panel, a capacitive touch screen panel, and the like. The touch screen panel TSP includes an input terminal receiving a driving voltage, transparent electrodes generating a touch recognition voltage, output terminals which are connected to the transparent electrodes and output the touch recognition voltage, and the like.

The electrophoresis display according to the embodiment of the invention further includes an electrophoresis driving circuit, a touch screen driving circuit 30, a timing controller 11, a host system 10, a power supply circuit 40, and the like.

The electrophoresis driving circuit includes a data driving circuit 12 for supplying the data voltage to the data lines 14 of the electrophoresis panel EPD, a gate driving circuit 13 for supplying the scan pulse to the gate lines 15 of the electrophoresis panel EPD, and the like.

The data driving circuit 12 includes a plurality of source driver integrated circuits (ICs), each of which outputs one of the positive data voltage Vpos, the negative data voltage Vneg, and a ground level voltage Vss based on input data. When digital data received from the timing controller 11 is '$01_2$', each of the source driver ICs outputs the positive data voltage Vpos of about +15V during an image update period. When the digital data received from the timing controller 11 is '$10_2$', the source driver IC outputs the negative data voltage Vneg of about −15V during the image update period. Further, when the digital data received from the timing controller 11 is '$00_2$' or '$11_2$', the source driver IC outputs the ground level voltage Vss of 0V during the image update period. Thus, the source driver IC selects one of 3-phase voltages Vpos, Vneg, and Vss as the data voltage in response to the digital data received from the timing controller 11 in the image update process and outputs the selected data voltage to the data lines 14. The output voltage of the source driver IC is supplied to the pixel electrode 1 of the pixel Ce via the data lines 14 and the TFT.

The gate driving circuit 13 includes a plurality of gate driver ICs. Each of the plurality of gate driver ICs includes a shift register, a level shifter for converting a swing width of an output signal of the shift register into a swing width suitable for a TFT drive, an output buffer connected between the level shifter and the gate lines 15, and the like. The gate driving circuit 13 sequentially outputs the scan pulses synchronized with the data voltage supplied to the data lines 14 during the image update period. The scan pulses swing between a positive gate voltage GVDD and a negative gate voltage GVEE and are applied to the gate electrode of the TFT through the gate lines 15.

The touch screen driving circuit 30 includes a plurality of touch ICs connected to the output terminals of the touch screen panel TSP. Each of the plurality of touch ICs converts an analog output voltage of a touch screen into digital touch data and compares the digital touch data with a previously set threshold value. The touch IC then extracts data greater than the threshold value as touch data. The touch IC calculates a coordinate data of the extracted touch data using a previously set touch recognition algorithm. The coordinate data includes a touch position information on the touch screen panel TSP.

The touch IC transfers touch coordinate data to the host system 10 during a high logic level period H of a state change interrupt signal CHG. The touch coordinate data is serial interface data SDA synchronized with a serial interface clock SCL. On the other hand, the touch IC does not transfer the touch coordinate data to the host system 10 during a low logic level period L of the state change interrupt signal CHG. If the host system 10 ignores data received from the touch IC during the low logic level period of the state change interrupt signal CHG, the touch IC may transfer its output data during the low logic level period of the state change interrupt signal CHG.

The timing controller 11 receives timing signals such as a vertical sync signal V, a horizontal sync signal H, and a clock CLK from the host system 10 and generates timing control signals for controlling operation timing of the data driving circuit 12 and operation timing of the gate driving circuit 13 during the image update period. The timing control signals include a source timing control signal for controlling the operation timing of the data driving circuit 12, a gate timing control signal for controlling the operation timing of the gate driving circuit 13, a touch screen timing control signal for controlling operation timing of the touch screen panel TSP, and the like.

The timing controller 11 supplies digital data set corresponding to gray level of input data to the source driver ICs based on a change between a current gray level state of the pixel and a next gray level state of the pixel to be updated in the image update process using a frame memory for storing an input image and a lookup table in which a waveform information of the data voltage is set.

The host system 10 supplies image data to be updated to the timing controller 11 and transfers the timing signals such as the vertical sync signal V, the horizontal sync signal H, and the clock CLK to the timing controller 11.

The host system 10 runs an application related to the touch coordinate data received from the touch ICs and performs a user command during the high logic level period of the state change interrupt signal CHG. The host system 10 controls the state change interrupt signal CHG at the low logic level during an operation period (i.e., the image update period) of the electrophoresis panel EPD. Further, the host system 10 may ignore data received from the touch ICs during the low logic level period of the state change interrupt signal CHG. For example, the host system 10 may transfer the digital data of the input image to the timing controller 11 and at the same time may toggle the state change interrupt signal CHG at the low logic level. Thus, the host system 10 recognizes coordinate data input during a non-operation period of the electrophoresis panel EPD as available coordinate data. On the other hand, the host system 10 compulsorily converts the logic level of the state change interrupt signal CHG into the low logic level during the operation period of the electrophoresis panel EPD and recognizes coordinate data input during the operation period of the electrophoresis panel EPD as unavailable data.

The power supply circuit 40 generates the driving voltages Vcc, Vcom, Vpos, Vneg, GVDD, and GVEE of the electrophoresis panel EPD and a driving voltage (not shown) of the touch screen using a DC to DC converter driven by an input voltage Vin input when the electrophoresis display is powered on. The logic power supply voltage Vcc is a logic voltage required to drive an application specific integrated circuit (ASIC) of the timing controller 11, the source driver ICs of the data driving circuit 12, the gate driver ICs of the gate driving circuit 13, and the touch ICs. The logic power supply voltage Vcc is generally generated as a DC voltage of about 3.3V. The positive data voltage Vpos is generally generated as a DC voltage of about +15V, and the negative data voltage Vpos is generally generated as a DC voltage of about −15V. The common voltage is generally generated as a DC voltage of about 0V to −2V. The negative gate voltage GVEE is generally generated as a DC voltage of about −20V, and the positive gate voltage GVDD is generally generated as a DC voltage of about +22V.

A method for updating the image of the electrophoresis panel EPD may use methods disclosed in United States Laid-open publication Nos. US 20080143700 A1 (Jun. 19, 2008), US 20080143668 A1 (Jun. 19, 2008), and US 20080150887 A1 (Jun. 26, 2008) corresponding to the present applicant, which are hereby incorporated by reference in their entirety.

The electrophoresis display according to the embodiment of the invention disables the touch recognition operation during a period (i.e., the image update period of the electrophoresis panel EPD) in which the noise is not induced from the electrophoresis panel EPD to the touch screen panel TSP. As a result, the electrophoresis display according to the embodiment of the invention may prevent the erroneous operation of the touch screen resulting from an influence of the electrophoresis panel EPD.

The electrophoresis display is used as an electronic book. In this instance, the user updates an image of the electrophoresis display and then updates a next image after time (generally, at least several minutes) required to read the updated image passed. In this way, a hold time of an already written image of the electrophoresis display is much longer than the image update period of the electrophoresis display. Thus, although the electrophoresis display according to the embodiment of the invention enables the touch recognition operation during only the non-operation period of the electrophoresis panel EPD and disables the touch recognition operation during the image update period, the user hardly feels inconvenience.

Figure 6:
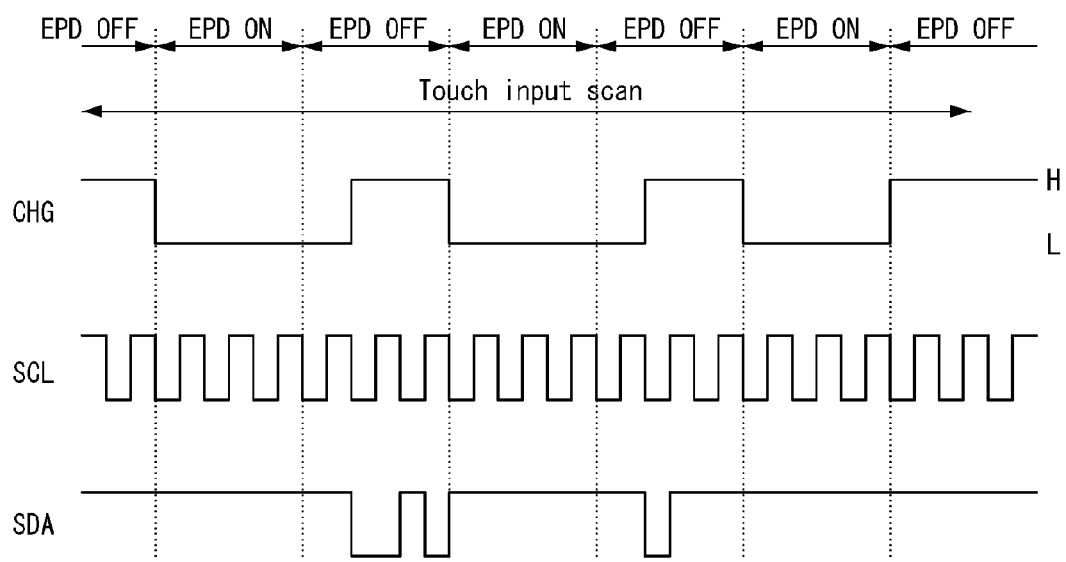
FIG. 6 is a waveform diagram illustrating signals transferred between a touch IC and a host system.

FIG. 6 is a waveform diagram illustrating signals transferred between the touch IC of the touch screen driving circuit 30 and the host system 10.

As shown in FIG. 6, the touch screen panel TSP repeatedly performs a touch input scan operation during an operation period EPD ON and a non-operation period EPD OFF of the electrophoresis panel EPD. The touch IC transfers the coordinate data to the host system 10 when the state change interrupt signal CHG is activated at the high logic level. Further, the touch IC does not transfer the coordinate data when the state change interrupt signal CHG is inactivated at the low logic level.

As another example, when the host system 10 ignores data received from the touch IC during the low logic level period of the state change interrupt signal CHG, the touch IC may transfer the coordinate data to the host system 10 irrespective of the logic level of the state change interrupt signal CHG.

Figure 7:
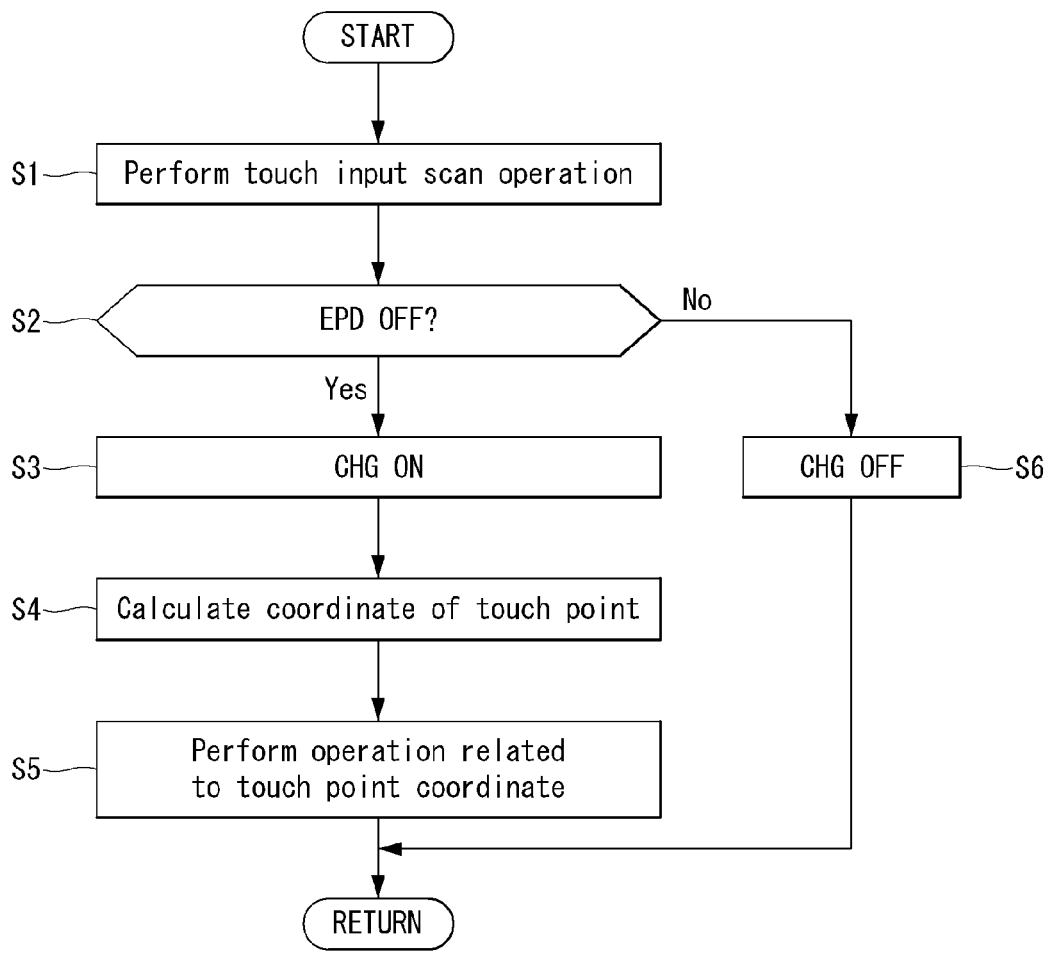
FIG. 7 is a flow chart sequentially illustrating each of stages in a method for driving a touch screen according to an example embodiment of the invention.

FIG. 7 is a flow chart sequentially illustrating each of stages in a method for driving the touch screen according to the example embodiment of the invention.

As shown in FIG. 7, the method for driving the touch screen according to the embodiment of the invention inputs the scan signal to the touch screen panel TSP and repeatedly performs the touch input scan operation in step S1. The method decides a current operation state of the electrophoresis panel EPD in step S2.

When the electrophoresis panel EPD is not driven, the electrophoresis display according to the embodiment of the invention activates the state change interrupt signal CHG in step S3. In this instance, the electrophoresis display according to the embodiment of the invention calculates a coordinate of a touch point generated during an activation period of the state change interrupt signal CHG in step S4 and performs an operation related to the touch point coordinate in step S5.

When the electrophoresis panel EPD is driven, the state change interrupt signal CHG is inactivated and touch data is unavailable in step S6.

As described above, the electrophoresis display according to the embodiment of the invention recognizes coordinate data generated during the non-operation period of the electrophoresis panel as available data and recognizes coordinate data generated during the operation period of the electrophoresis panel as unavailable data, thereby preventing the erroneous operation of the touch screen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electrophoresis display comprising:
   an electrophoresis panel;
   an electrophoresis driving circuit configured to drive the electrophoresis panel and write an image to the electrophoresis panel;
   a touch screen panel mounted on the electrophoresis panel;
   a touch screen driving circuit configured to output coordinate data of a touch position on the touch screen panel based on a signal received from the touch screen panel; and
   a host system configured to recognize the coordinate data during a non-operation period of the electrophoresis panel as available data and recognize the coordinate data during an operation period of the electrophoresis panel as unavailable data,
   wherein a state change interrupt signal, a serial interface clock, and serial interface data including the coordinate data are transferred between the host system and the touch screen driving circuit, and
   wherein the host system controls the state change interrupt signal at a first logic level during the operation period of the electrophoresis panel and controls the state change interrupt signal at a second logic level during the non-operation period of the electrophoresis panel.

2. The electrophoresis display of claim 1, wherein the host system ignores data received from the touch screen driving circuit when the state change interrupt signal is at the first logic level.

3. The electrophoresis display of claim 2, wherein the touch screen driving circuit transfers the coordinate data to the host system irrespective of a logic level of the state change interrupt signal.

4. The electrophoresis display of claim 1, wherein the touch screen driving circuit transfers the coordinate data to the host system only when the state change interrupt signal is at the second logic level.

5. The electrophoresis display of claim 1, further comprising a timing controller configured to transfer image data to the electrophoresis driving circuit and control an operating timing of the electrophoresis driving circuit and an operating timing of the touch screen driving circuit,
   wherein the host system transfers the image data to the timing controller, and at the same time, toggles the state change interrupt signal at the first logic level.

6. A method for driving a touch screen of an electrophoresis display including an electrophoresis panel, an electrophoresis driving circuit which drives the electrophoresis panel and writes an image to the electrophoresis panel, a touch screen panel mounted on the electrophoresis panel, and a touch screen driving circuit which outputs coordinate data of a touch position on the touch screen panel based on a signal received from the touch screen panel, the method comprising:
   deciding whether or not the electrophoresis panel is driven;
   recognizing the coordinate data during a non-operation period of the electrophoresis panel as available data; and
   recognizing the coordinate data during an operation period of the electrophoresis panel as unavailable data,
   wherein a state change interrupt signal, a serial interface clock, and serial interface data including the coordinate data are transferred between a host system and the touch screen driving circuit, and
   wherein the host system controls the state change interrupt signal at a first logic level during the operation period of the electrophoresis panel and controls the state change interrupt signal at a second logic level during the non-operation period of the electrophoresis panel.

7. The method of claim 6, further comprising:
   generating a state change interrupt signal indicating whether or not the coordinate data is available; and
   controlling the state change interrupt signal at the second logic level during the non-operation period of the electrophoresis panel.

* * * * *